(12) United States Patent
Stockton et al.

(10) Patent No.: US 7,835,971 B2
(45) Date of Patent: Nov. 16, 2010

(54) METHOD AND SYSTEM CONFIGURED FOR FACILITATING MANAGEMENT OF INTERNATIONAL TRADE RECEIVABLES TRANSACTIONS

(76) Inventors: Michael Stockton, 6205 Mesa Grande, Austin, TX (US) 78749; Will Ballard, 12804 Noyes La., Austin, TX (US) 78732; Dallas Goodman, 1005 3$^{rd}$ St., Abernathy, TX (US) 79311; Greg Jones, 10805 Chateau Hill, Austin, TX (US) 78750

( * ) Notice: Subject to any disclaimer, the term of this patent is extended or adjusted under 35 U.S.C. 154(b) by 740 days.

(21) Appl. No.: 10/581,987

(22) PCT Filed: Dec. 13, 2004
(Under 37 CFR 1.47)

(86) PCT No.: PCT/US2004/041597

§ 371 (c)(1),
(2), (4) Date: Aug. 31, 2007

(87) PCT Pub. No.: WO2005/059690

PCT Pub. Date: Jun. 30, 2005

(65) Prior Publication Data

US 2008/0222639 A1    Sep. 11, 2008

Related U.S. Application Data

(60) Provisional application No. 60/529,634, filed on Dec. 12, 2003.

(51) Int. Cl.
*G00Q 40/00*        (2006.01)
(52) U.S. Cl. .............................. 705/37; 705/35; 705/36; 705/38; 705/39; 705/40; 705/41; 705/42; 705/43; 705/44; 705/45

(58) Field of Classification Search ................. 235/379; 705/1, 26, 28, 30, 34, 37–40, 42, 54, 65, 705/80
See application file for complete search history.

(56) References Cited

U.S. PATENT DOCUMENTS 5,424,938 A  *  6/1995  Wagner et al. ................. 705/42
(Continued)

FOREIGN PATENT DOCUMENTS

WO    WO 2005/122078    * 12/2005

OTHER PUBLICATIONS

The Immigrant Investor Program: Proposed Solutions to Particular Problems. MacDonald, Beth. Law & Policy in International Business V31, No. 2 pp. 403-452 Winter 2000.*

*Primary Examiner*—Charles R Kyle
*Assistant Examiner*—Robert R Niquette
(74) *Attorney, Agent, or Firm*—Galasso & Associates, LP

(57)    ABSTRACT

A receivables transaction management platform is configured for facilitating management of international trade receivables transactions. The platform includes a task manager layer and a platform functionality layer. The task manager layer is configured for facilitating management of transaction information workflow tasks and export receivables tasks. The platform functionality layer is accessible by at least a portion of the managers and is configured for enabling facilitation of the transaction information workflow tasks and the export receivables tasks. Managing the transaction information workflow tasks and export receivables tasks includes facilitating preparation of a document and data portfolio required for settlement of an international trade receivables transaction, facilitating electronic submission of the document and data portfolio to a designated recipient and facilitating acceptance of the document and data portfolio. The platform functional components are configured for enabling user workflow functionality, data mapping functionality, data analysis functionality, data storage functionality and third party access functionality.

16 Claims, 6 Drawing Sheets

U.S. PATENT DOCUMENTS

| | | | | |
|---|---|---|---|---|
| 5,694,552 | A * | 12/1997 | Aharoni | 705/37 |
| 5,710,889 | A * | 1/1998 | Clark et al. | 235/379 |
| 5,717,989 | A * | 2/1998 | Tozzoli et al. | 705/37 |
| 5,732,400 | A * | 3/1998 | Mandler et al. | 705/26 |
| 5,890,140 | A * | 3/1999 | Clark et al. | 705/35 |
| 6,058,378 | A * | 5/2000 | Clark et al. | 705/37 |
| 6,151,588 | A * | 11/2000 | Tozzoli et al. | 705/37 |
| 6,460,020 | B1 * | 10/2002 | Pool et al. | 705/26 |
| 6,996,542 | B1 * | 2/2006 | Landry | 705/40 |
| 7,069,234 | B1 * | 6/2006 | Cornelius et al. | 705/26 |
| 7,082,412 | B1 * | 7/2006 | Treider et al. | 705/38 |
| 7,155,409 | B1 * | 12/2006 | Stroh | 705/37 |
| 7,206,768 | B1 * | 4/2007 | deGroeve et al. | 705/54 |
| 7,236,950 | B2 * | 6/2007 | Savage et al. | 705/34 |
| 7,249,069 | B2 * | 7/2007 | Alie et al. | 705/28 |
| 7,340,433 | B1 * | 3/2008 | Kay et al. | 705/38 |
| 7,383,233 | B1 * | 6/2008 | Singh et al. | 705/80 |
| 7,475,037 | B2 * | 1/2009 | Carlos et al. | 705/38 |
| 2001/0034720 | A1 * | 10/2001 | Armes | 705/65 |
| 2002/0049671 | A1 * | 4/2002 | Trende et al. | 705/40 |
| 2002/0095355 | A1 * | 7/2002 | Walker et al. | 705/26 |
| 2002/0095373 | A1 * | 7/2002 | Melchior et al. | 705/39 |
| 2002/0099655 | A1 * | 7/2002 | Melchior et al. | 705/40 |
| 2002/0120570 | A1 * | 8/2002 | Loy | 705/40 |
| 2002/0178021 | A1 * | 11/2002 | Melchior et al. | 705/1 |
| 2003/0023527 | A1 * | 1/2003 | Wilce et al. | 705/35 |
| 2003/0040990 | A1 * | 2/2003 | Lee et al. | 705/30 |
| 2004/0019560 | A1 * | 1/2004 | Evans et al. | 705/40 |
| 2004/0024692 | A1 * | 2/2004 | Turbeville et al. | 705/38 |
| 2004/0260648 | A1 * | 12/2004 | Carlos et al. | 705/42 |

* cited by examiner

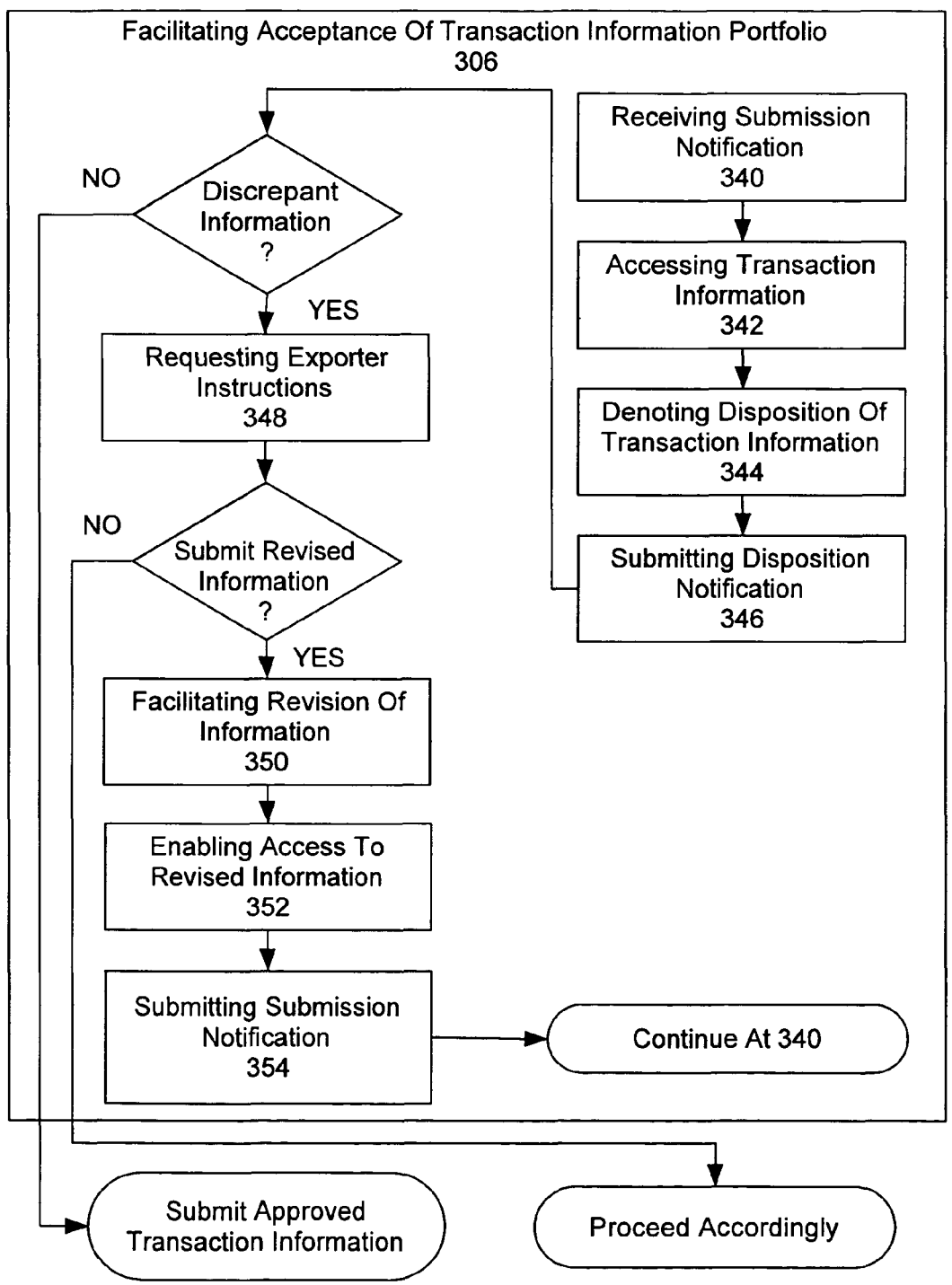

METHOD AND SYSTEM CONFIGURED FOR FACILITATING MANAGEMENT OF INTERNATIONAL TRADE RECEIVABLES TRANSACTIONS

CROSS REFERENCE TO RELATED APPLICATIONS

This application claims priority to co-pending U.S. Provisional Patent Application having Ser. No. 60/529,634 filed Dec. 12, 2003 entitled "Digital Document Manager And On-Line Letter Of Credit Document Negotiation Platform", having a common applicant herewith and being incorporated herein by reference in its entirety.

FIELD OF THE DISCLOSURE

The disclosures made herein relate generally to methods and systems configured for processing data and, more particularly, to methods and systems configured for facilitating management international trade receivables transactions.

BACKGROUND

Exporting of goods is a sizable component to the economy of most industrialized nations. For example, companies based in the United States (U.S.) account for as much as about $1 trillion of exported goods each year. However, even in view of the significant volume of goods and related financial transactions associated with exporting of goods internationally, international trade still has a heavy reliance of the costly creation and hand-delivery of transaction information (i.e., documents and/or data) for clearance through customs and financial settlement. Recently heightened homeland security policies and requirements on international trade only serve to further burden conventional approaches to facilitating international trade. In quantifying the degree of this burden, a survey by the United Nations estimated administrative costs for international trade to be as high as about 7% of world trade.

Administrative tasks for international trade and their associated financial costs are felt not only by financial institutions, but also by companies large and small. Relatively large companies (i.e., about 500 or more employees) account for as much as about 71% of U.S. exports value and relatively small companies (i.e., less than about 100 employees) represent as much as about 89% of U.S. exporting entities. Regardless of size or global location, conventional approaches for facilitating international trade adversely impact nearly all exporters.

Export letters of credit are a key component to facilitating international trade. An export letter of credit ensures that an exporter (i.e., a seller) of goods will receive payment from a foreign customer ordering such goods (i.e., a buyer). Facilitating international trade via an export letter of credit includes the exporter requiring that the customer's bank issue a letter of credit. The export letter of credit serves to substitute the credit standing of the customer's bank (i.e., the issuing bank) for that of the customer, thereby minimizing the risk of non-payment due to factors arising from various considerations (e.g., political and/or financial considerations).

An export letter of credit is one example of a payment contract. Other payment contracts used in international trade include documentary collections and open account transaction payment. In the case of the export letter of credit, the buyer's financial institution's credit is substituted for the buyer's credit and the buyer must deliver multiple compliant transaction information to banks within a limited time period in order to be paid under the letter of credit. In documentary collection payment contracts, the buyer cannot receive the title to the purchased goods until making payment for the goods at the local bank office. In an open account payment contract, the buyer may receive the goods without payment but is expected to pay the seller within a fixed period of time. In every case, multiple compliant transaction information must be delivered to various parties involved in each transaction to satisfy the terms of the applicable payment contract.

A transaction for facilitating payment in international trade is referred to herein as an international trade receivables transaction. From a buyer's standpoint, such a financial transaction is a payment transaction. Conversely, from a seller's standpoint, such a transaction is a receivables transaction.

Conventional approaches for facilitating international trade receivables transactions are known to have one or more shortcomings. One example of such shortcomings is that complying with transaction information required for payment contracts of international trade receivables transactions is generally tedious and complex work for the treasury, credit and/or logistics departments of most companies, which frequently leads to errors in such transaction information, and delays in delivering compliant transaction information. As a result payment is often delayed, reduced or not received and companies generally have low productivity and/or increased headcount in their international business groups to address these issues. Another example of such shortcomings is that one or more of the required parties in an international trade receivables transaction (e.g., the buyer, the seller, the issuing bank, the confirming bank, etc) are often not appropriately aware of important requirements within a particular payment contract, again resulting in delays in payment, underpayment or non-payment. Yet another example of such shortcomings is that much of the required transaction information (e.g., documents) associated with a payment contract for an international trade receivables transaction are prepared by third party venders (e.g., freight forwarders, carriers, insurance providers, inspection companies and the like), which often leads to transaction information that is non-compliant with respect to the payment contract, and which require significant time and expense to aggregate, proof and correct, resulting in further delay. One last example of such shortcomings is that many companies have distributed functional departments (e.g., manufacturing, billing, credit and logistics departments) that may be separated by several thousands of miles, which due to inherent logistical issues (e.g., language barriers, couriering timelines, business hours, etc) often contributes to relatively slow and costly internal processing of required transaction information associated with payment contracts for an international trade receivables transaction.

Therefore, facilitating management of international trade receivables transactions in a manner that overcomes one or more of the shortcomings associated with conventional approaches for facilitating management of international trade receivables transactions would be advantageous, useful and novel.

SUMMARY OF THE DISCLOSURE

The inventive disclosures made herein enable international trade receivables transactions to be facilitated in a manner that overcomes shortcomings associated with conventional approaches for facilitating management of international trade receivables transactions. In this manner, systems and methods in accordance with the inventive disclosures made herein streamline complex documentation and settlement processes of international trade receivables transactions for exporters and associated parties such as banks, importers and freight forwarders. These systems and methods are configurable for supporting a variety of international trade receivables processes ranging from an open account transaction process to a letter of credit transaction process. The advantages of these systems and methods include, but are not limited to, improving the accuracy of information (e.g., documentation) for international trade receivables transactions, reducing days sales outstanding (DSO), reducing direct documentation creation, delivery and payment processing costs, and increasing operational efficiencies and collaboration of various non-centralized transaction parties (e.g., remote employees, financial institutions, third-party service providers, etc).

A transaction receivables management platform is one embodiment of the inventive disclosures made herein. The transaction receivables management platform dictates workflow that controls the receipt of relevant transaction information and enables the creation, review, approval, and distribution of accurate transaction information in international trade receivables transactions. It is implemented and configured in a manner that provides for a flexible, secure and reliable means of presenting such transaction information via a globally accessible public network such as the Internet. It is structured as one common content platform with information repository and is configured for facilitating transaction information (e.g., document) uploading and archiving, inter-party communications and information storage and retrieval. Another capability is real-time trade receivables reporting and business intelligence, which serves to proactively manage cost and risk.

In one embodiment of the inventive disclosures made herein, a receivables transaction management platform is configured for facilitating management of international trade receivables transactions. The platform includes a task manager layer and a platform functionality layer. The task manager layer is configured for facilitating management of transaction information workflow tasks and the export receivables tasks. The platform functionality layer is accessible by at least a portion of the managers and is configured for enabling facilitation of the transaction information workflow tasks and the export receivables tasks.

In another embodiment of the inventive disclosures made herein, a computer-implemented method is configured for facilitating management of international trade receivables transactions. The method comprises facilitating system-managed preparation of transaction information required for settlement of an international trade receivables transaction and facilitating system-managed acceptance of said transaction information.

In another embodiment of the inventive disclosures made herein, a computer-implemented method is configured for facilitating export receivables workflow tasks. The method comprises a plurality of interrelated and/or complimentary operations. After uploading an electronic copy of a payment contract upon which an international trade receivables transaction is dependent, operations are performed standardizing such data, for selecting required documents comprised by a transaction information portfolio (e.g., selecting them from a customized user library), facilitating system-managed verification of the required documents and bundling the document portfolio whereby an association is provided between data elements (e.g., populatable fields and their contents) in each of the documents. The method further includes operations for enabling the delivery of the bundled documents to recipients and the communication of the receiver's disposition of the documents as being discrepant or acceptable, enabling a description corresponding to a corresponding discrepancy to be specified and enabling revised versions of discrepant portions of the documents to be re-submitted individually or in the aggregate to the designated recipient.

Advantageously, methods and systems in accordance with the inventive disclosures made herein are configured in a manner enabling transaction information (i.e., documents and/or data) for an international trade receivables transaction to be verified as being compliant with the Publication 500 of the International Chamber of Commerce's Uniform Customs and Practice for Documentary Credits including a recent supplement to the UCP 500 to cover the deliver of transaction information electronically ("e-UCP") where applicable. Such compliance, including e-UCP is applicable, is referred to herein as being UCP 500 compliant. UCP 500 is the international banking standard by which letter of credit information is reviewed. It governs considerations such as what is an original document, what is an original signature, etc.

In accordance with the inventive disclosures made herein, transaction information is configured (e.g., designed, prepared and maintained) in a manner that is UCP 500 compliant, including e-UCP where applicable. Accordingly, through verification of the transaction information, the transaction information has been determined to be UCP 500 compliant, and digitally delivered transaction information is certified as being UCP 500 compliant. Such UCP 500 compliant transaction information includes signatures (e.g., printed signatures and/or digital signatures) indicating and certifying that such transaction information is UCP 500 compliant and include system-implemented markings that indicate which portions of such transaction information (e.g., which printed documents) are copies and which are originals.

These and other objects, advantages and/or embodiments of the inventive disclosures made herein will become readily apparent upon further review of the following specification and associated drawings.

BRIEF DESCRIPTION OF THE DRAWING FIGURES

FIG. 6 depicts an embodiment of an operation for facilitating system-managed acceptance of the transaction information portfolio in accordance with the method depicted in FIG. 3.

DETAILED DESCRIPTION OF THE DRAWING FIGURES

Figure 1:
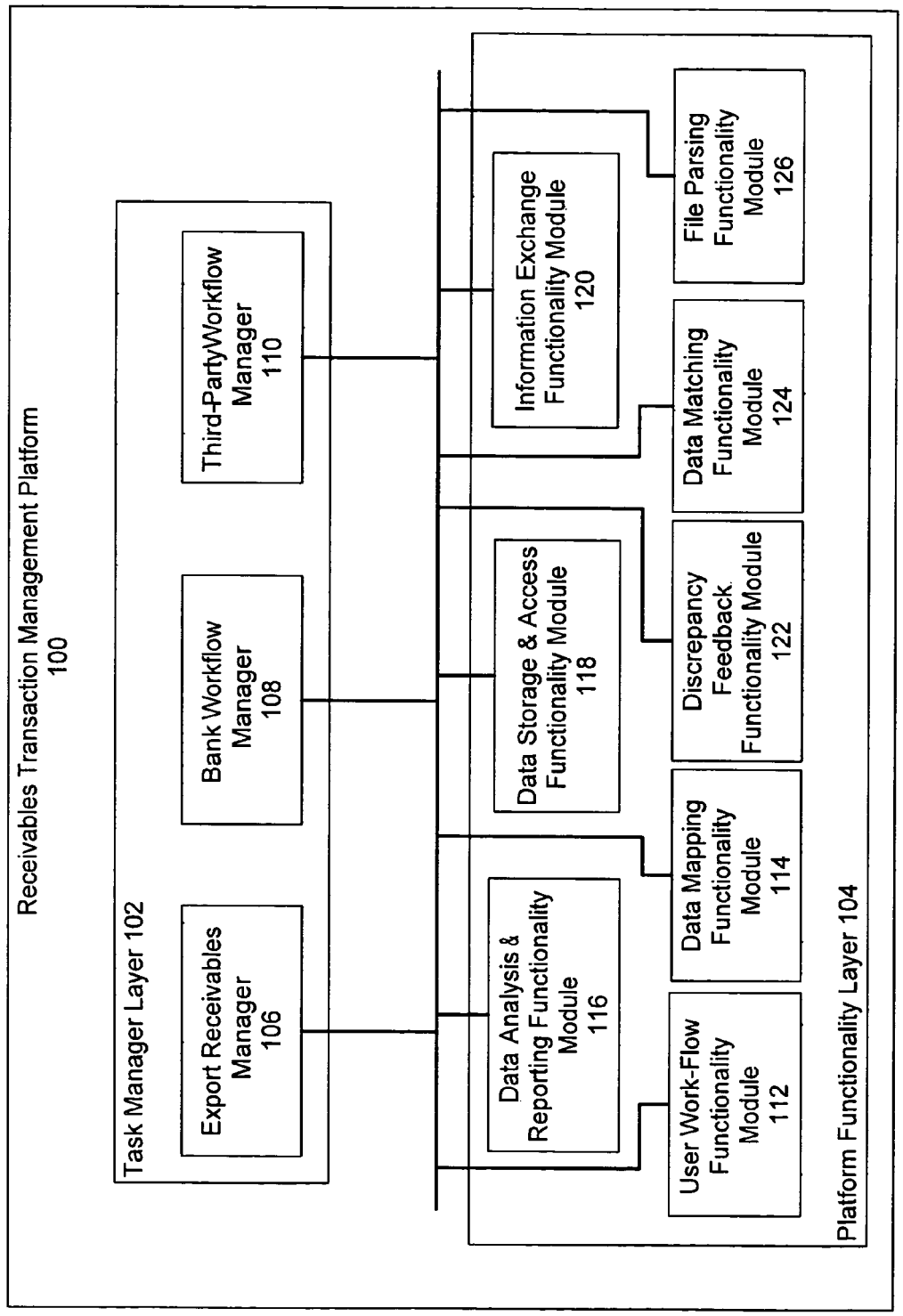
FIG. 1 depicts an embodiment of a receivables transaction management platform in accordance with the inventive disclosures made herein.

FIG. 1 depicts an embodiment of a receivables transaction management platform 100 in accordance with the inventive disclosures made herein. The receivables transaction management platform 100 includes a task manager layer 102 and a platform functionality layer 104, which are specifically configured for enabling international trade receivables transactions to be advantageously facilitated with respect to prior art solutions. Its structure, functionality and features provide for a multi-party solution for preparing transaction information (e.g., a documents) for international trade receivables transactions, submitting the transaction information (e.g., the documents) to its respective parties and enabling payment of the international trade receivables transactions in accordance with the respective transaction information.

The task manager layer 102 and the platform functionality layer 104 are examples of interconnected software layers. Preferably, but not necessarily, the task manager layer 102 is accessible via the Internet (i.e., a public network). Through such Internet accessibility, users of the receivables transaction management platform 100, who already have access to the Internet, may perform the transaction information workflow tasks and the export receivables tasks over a public network enabled connection without the need for installing any new software or hardware. Another advantage of such network connectivity is that users of a common exporting entity who are physically located at disparate locations (e.g., different cities, states, countries, etc) may seamlessly collaborate, review and/or facilitate required tasks.

The task manager layer 102 is configured for facilitating management of transaction information workflow tasks and export receivables tasks. The task manager layer 102 includes an export receivables manager 106, a bank workflow manager 108 and third party workflow manager 110. Examples of managing transaction information workflow tasks and export receivables tasks includes uploading and reading letter of credit or other transaction data, facilitating preparation of a transaction information portfolio (e.g., a document portfolio) required for settlement of an international trade receivables transaction, performing system-managed verification of required portions (e.g., documents) of the transaction information portfolio, facilitating electronic submission of the transaction information portfolio (e.g., the document portfolio) to a designated recipient and facilitating system-managed acceptance of the transaction information (e.g., the documents).

Various types of users are authorized for interacting with the various managers (106-110). Users of the export receivables manager 106 include, but are not limited to, one or more parties of an organization engaged in exporting goods who have the responsibility for initiating, overseeing and/or settling respective aspects of international trade receivables transactions. An export administrator and/or international credit managers for a company are examples of such users of the export receivables manager 106. Users of the bank workflow manager 108 include, but are not limited to, one or more parties of an international banking organization who have the responsibility for reviewing and approving or disapproving transaction information delivered for payment with respect to international trade receivables transactions. A document examiner in a bank examination department located in the United States or other countries are examples of such a user of the bank workflow manager 108. Users of the third-party workflow manager 110 include, but are not limited to, one or more parties of an organization engaged in buying goods, brokering various aspects of international trade receivables transactions and providing third-party transaction information (e.g., documents). A designated representative of an entity such as an exporter, importer, bank, freight forwarder, insurers, couriers, and other third-parties engaged in an international trade receivables transaction are an example of users of the third-party workflow manager 110.

The export receivables manager 106 provides export entities with functionality for import of data (e.g., payment contract information), for creating instances of international trade receivables transactions, managing and editing transaction information, facilitating third-party transaction information creation workflow and facilitating presentation or delivery of transaction information to banks, buyers, exporters, third parties and/or other entities. The bank workflow manager 108 enables international trade banks to receive, review, print and give feedback on international trade transaction information for letter of credit, documentary collection and open account transactions presented by beneficiaries. In one embodiment, a bank examiners log onto the secure site (e.g., a receivables transaction management platform portal) and access respective portion of the transaction information individually or as part of an associated set/collection (e.g., a transaction information portfolio), which is locked and cannot be edited and which can be printed with one keystroke. Workflow of the bank workflow manager 108 is provided to permit examiners to facilitate discrepancy feedback with respect to a designated payment contract. Additionally, the bank workflow manager 108 includes functionality for generating reports, searching and retrieving information and digitally storing transaction information. The third-party workflow manager 110 enables agents, buyers or any other third party to receive, review, print and give feedback on international trade transaction information delivered by users. In one embodiment, users of the third-party workflow manager 110 log onto the secure site (e.g., a receivables transaction management platform portal) and open portions of the transaction information individually or as part of an associated set/collection (e.g., a transaction information portfolio), which is locked and cannot be edited and which can be printed with on keystroke. Workflow of the third-party workflow manager 110 is provided to permit buyer or agent users to facilitate discrepancy feedback to the designated beneficiary.

The platform functionality layer 104 is accessible by the managers (106-110) of the task manager layer 102 and is configured for enabling facilitation of the transaction information workflow tasks and the export receivables tasks. In one embodiment, the platform functionality layer 104 includes a plurality of modules configured for imparting functionality necessary for facilitating such transaction information workflow tasks and export receivables tasks. Examples of such functionality and associated modules include, but are not limited to, a user/workflow functionality module 112, a data mapping functionality module 114, a data analysis and reporting functionality module 116, a data storage and access functionality module 118, an information exchange functionality module 120, a discrepancy feedback functionality module 122, a data matching functionality module 124 and a file parsing functionality module 126.

User/workflow functionality controls the creation, review, approval, and distribution of accurate transaction information for international trade receivables transactions. In one embodiment, a customized document library is created from each exporter's paper shipping information (e.g., documents) so users see on the screen what they usually see on paper. One useful and advantageous aspect of workflow functionality is that information (i.e., data) from a payment contract document (e.g., a letter of credit) may be written directly from a digital version the payment contract document to required documents (i.e., information extracted from the digital version of the payment contract and used in populating fields of required system-populated fields of transaction information. Through such extracting and populating functionality, errors associated with manual data entry and transcriptions are reduced, if not eliminated.

Additionally, user/workflow functionality is preferably, but not necessarily, configurable on a customer-by-customer basis (i.e., user-by-user basis) depending upon the transaction information that is essential for their business and process. Users can identify different documents as the main data entry points. Internal review and approval processes are included and the various functions under export document receivables manager module 116 can be assigned or withheld from individual users based on the role of such user. Custom configured user/workflow functionality supports internal documentation policies and procedures of an exporter. Additionally, this user/workflow functionality also provides for every change made to any document or data (i.e., transaction information) being captured with the user name, a date stamp and/or time stamp for tracking/auditing purposes.

Mapping and cross-referencing of information across the required documents (i.e., transaction information) of an international trade receivables transaction enables the creation and submission of integrated and consistent "smart documents", which share common portions of information. In one embodiment, the data mapping functionality module 114 is configured for providing data parsing functionality for each user bank's formats for delivering data. This parsing capability enables transaction information (e.g., data) to be read directly from an electronic copy (e.g., digital copy) of documents and data delivered by banks, to store the data in a database (i.e., as provided for by the data storage and access functionality module 118) and to automatically map this data to all the required system-populated transaction information fields.

The platform functionality layer 104 enables Internet connectivity. Through such Internet connectivity, tasks performed by the managers (106-110) of the task manager layer 102 may be performed in a flexible, secure and reliable means. In one embodiment of such Internet connectivity, the managers (106-110) of the task manager layer 102 may be accessed at almost any time from almost anywhere through an intuitive, common website interface. Document sharing, verification and execution are securely facilitated via encrypted information exchange and digitized signatures, tracking of revisions to transaction information, and time stamping of each manager interaction event.

The platform functionality layer 104 serves as a common information management platform and repository that enables uploading and archiving of transaction information, communications between various users, and filing of information. Accordingly, the platform functionality layer 104 provides for centralized, secure information storage thereby eliminating the need for storing and maintaining paper files.

Third party access interface functionality enables third parties such as, for example, freight forwarders and insurance providers to provide (e.g., upload) required transaction information that is prepared by respective third parties. In every international trade receivables transaction, certain transaction information needs to be delivered by third party freight forwarders, insurance companies, inspection companies or government agencies (e.g., third-party prepared transaction information). This transaction information must match the terms of a governing transaction information such as a payment contract (e.g., letter of credit) or purchase order. The third party access interface module 120 is configured for users (e.g., an exporter) to create document templates are necessary to simplify and accelerate the delivery of compliant transaction information by such third parties.

The data reporting and analysis functionality enables real-time trade receivables reporting and business intelligence for proactively managing cost and risk. This functionality enables exporters to analyze key performance metrics such as, for example, transaction fees, country risk, settlement duration, transaction duration, vender performance, customer credit exposure and the like. Additionally, this functionality provides for enterprise-wide visibility and a means for measuring current status and trends across dispersed global business units. In one embodiment, statistical reports may be generated in accordance with three different categories: Fees, Logistics, and Transactions. Data for these reports is drawn from information managed by the receivables transaction management platform. For example, a Banking Fees Report provides a detailed analysis of the banking fees incurred with each shipment, a Logistics Details report provides critical shipping date information and tracks third party service providers and their fees, and a Transaction Details report provides an overview of key shipment and expiry dates, bank fees and DSO performance.

Figure 2:
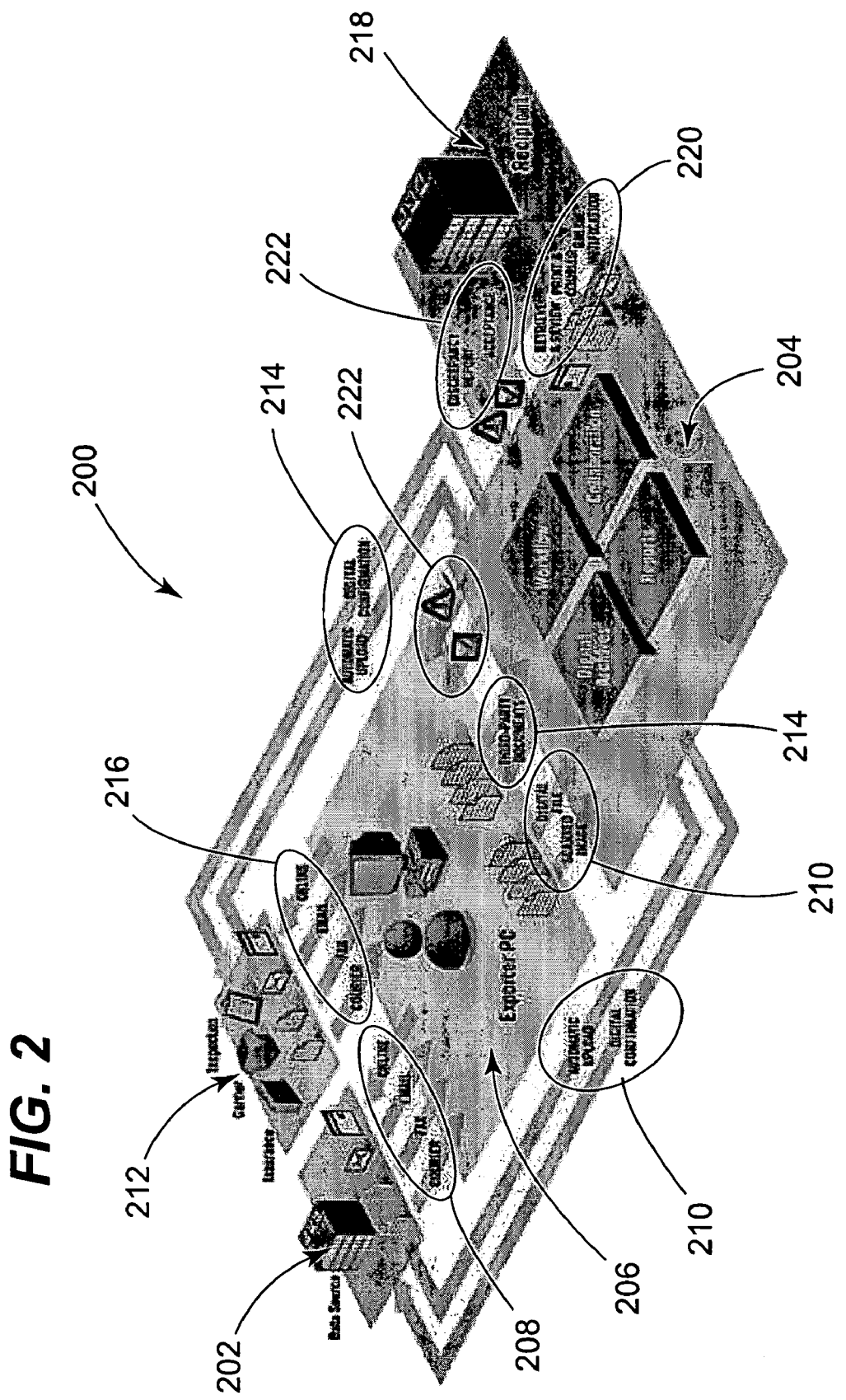
FIG. 2 depicts an embodiment of a workflow structure for facilitating management of international trade receivables transactions in accordance with the inventive disclosures made herein.

FIG. 2 depicts an embodiment of a workflow structure 200 for facilitating management of international trade receivables transactions in accordance with the inventive disclosures made herein. A data source 202 facilitates transfer of transaction information (e.g., data and/or documents) for submission to a receivables transaction management platform 204. An exporter 206 initiates and facilitates such submission. It should be understood that this transaction information at least partially enables facilitation of an international trade receivables transaction in accordance with the inventive disclosures made herein. Means 208 such as, for example, courier, facsimile, e-mail and/or on-line form is utilized for transferring such transaction information (e.g., delivery of the one or more documents). A letter of credit document, a purchase order document, sales contract document, an invoice document, a packing list document, a certificate document, a transport manifest document, a fax template and the like are examples of transaction information.

The exporter 206 then initiates providing required and/or requested portions of the transaction information to the receivables transaction management platform 204. The receivables transaction management platform 100 depicted in FIG. 1 is an example of the receivables transaction management platform 204 depicted in FIG. 2. Examples of means 210 for providing the transaction information to the receivables transaction management platform 204 include, but are not limited to digital uploaded directly from the data source 202 (e.g., a file from which the transaction information can be extracted by the receivables transaction management platform 204), transmitting scanned images of documents from the exporter 206 and transmitting digital files from the exporter 206. Where the means 210 for providing all or a portion of the transaction information includes digitally transmitting such transaction information directly from the data source 202, the receivables transaction management platform 204 issues a receipt confirmation for reception by the data source 202 in response to successful reception of such transaction information. A similar confirmation is contemplated when transaction information is provided to the receivables transaction management platform 204 from the exporter 206 (e.g., an e-mail to the exporter 206 indicating successful reception or an on-screen message indicating successful reception).

Once the transaction information (i.e., as provided from the data source 202) is provided to the receivables transaction management platform 204, the receivables transaction management platform 204 facilitates management of such transaction information (i.e., transaction information management). Such management includes enabling editing and/or formatting of the information comprised by such transaction information. Preferably, but not necessarily, such management is system-directed, whereby transaction information management is performed in a consistent and systematic manner.

As required during management of transaction information, the receivables transaction management platform 204 facilitates aggregation of required transaction information that is prepared and/or provided by one or more respective third parties 212 (i.e., third-party transaction information such as third-party documents). The third-party transaction information represents information that is completed by a respective third party 212 and are subsequently provided to the exporter 206 for delivery to the receivables transaction management platform 204 or that are provided directly to the receivables transaction management platform 204 by the respective third party 212. Examples of such third-party transaction information include, but are not limited to, airway bills, insurance certificates, inspection certificates, government certificates and the like.

A variety of means 214 may be implemented for facilitating delivery of the third-party transaction information to the receivables transaction management platform 204. Examples of means 214 for providing the third party transaction information to the receivables transaction management platform 204 include, but are not limited to, digital data uploaded directly from the respective third party 212 (e.g., a file from which the information can be extracted by the receivables transaction management platform 204), transmitting scanned images of the third party documents from the exporter 206 after being provided to the exporter 206 via a means 216 such as, for example, courier, facsimile, e-mail and/or on-line form, and transmitting digital data and document files from the exporter 206 after being provided to the exporter 206 via the means 216 for providing the transaction information to the exporter 206. Where the means 214 for providing a third-party transaction information to the receivables transaction management platform 204 is digitally uploading the transaction information directly from the third party 212, the receivables transaction management platform 204 issues a receipt confirmation for reception by the respective third party 212 in response to successful reception of the transaction information. A similar confirmation is contemplated when transaction information is provided to the receivables transaction management platform 204 from the exporter 206 (e.g., an e-mail to the exporter 206 and/or third party 212 indicating successful reception or an on-screen message indicating successful reception).

The underlying objective of receiving transaction information (i.e., completed documents and/or data) is preparation and review of transaction information portfolios for upon which respective international trade receivables transactions are carried out. The receivables transaction management platform 204 facilitates such preparation functionality in a manner that is systematic, reliable and repeatable. Through such a systematic, reliable and repeatable manner of preparing transaction information portfolios, the receivables transaction management platform 204 is able to coordinate, control and verify the completeness and accuracy of the transaction information comprised by each transaction information portfolio (i.e., facilitating verification of the transaction information comprised by a transaction information portfolio). Additionally, this transaction information preparation functionality is carried out in a transaction-specific manner, whereby the specific transaction information required for preparing a particular transaction information portfolio is determined by the receivables transaction management platform 204 (e.g., dependent upon the type of payment contract).

After preparation and verification of the transaction information portfolio and after certain aspects of the international trade receivables transaction has been completed (e.g., goods of the international trade receivables transaction being delivered to a designated freight forwarder or importer), the receivables transaction management platform 204 facilitates acceptance of the transaction information portfolio for enabling settlement of the international trade receivables transaction. To this end, the receivables transaction management platform 204 facilitates delivery of the verified transaction information portfolio to a recipient 218 for enabling access of the transaction information portfolio by the recipient 218. Means 220 for facilitating delivery of the verified transaction information portfolio by the recipient 218 include, for example, hand delivery of a printed copy of the verified transaction information portfolio, facsimile of the verified transaction information portfolio, delivery via email attachment and on-line delivery via a website (i.e., a receivables transaction management platform portal). After the recipient 218 gains access to and examines (i.e., reviews) the verified transaction information portfolio, the recipient 218 presents their disposition 222 of the verified transaction information portfolio to the receivables transaction management platform 204. Such disposition may be either acceptance of the transaction information portfolio or rejection of the transaction information portfolio in view of one or more discrepant elements of transaction information (e.g., one or more documents and/or a portion of its constituent data). In the case where the recipient rejects the transaction information portfolio in view of one or more discrepancies in the transaction information, the recipient 218 provides a discrepancy report, which delineates one or more discrepancies in the transaction information. In view of the one or more discrepancies, the receivables transaction management platform facilitates negotiation of the discrepant transaction information (e.g., assessing the alleged discrepancies and determining whether to submit revised copies of any discrepant transaction information). Preferably, but not necessarily, delivery and, if required, negotiation of the transaction information portfolio are facilitated on-line via the receivables transaction management platform portal, whereby interaction between the receivables transaction management platform 204 and the recipient (e.g., submission of the discrepancy report and submission of any subsequent revised transaction information) is implemented in a system-managed manner.

When the transaction information portfolio is acceptable to the recipient 218, the receivables transaction management platform 204 facilitates any further execution of such transaction information and records the corresponding finalized documents and disposition of the transaction information portfolio. Through the workflow structure 200, international trade receivables transactions are facilitated advantageously with respect to conventional approaches for facilitating such transactions. More specifically, the workflow structure 200 results in streamlined transactions with reduced administrative, delivery and third-party costs and operational risks and that improve final delivery timelines for good of the transactions.

Figure 3:
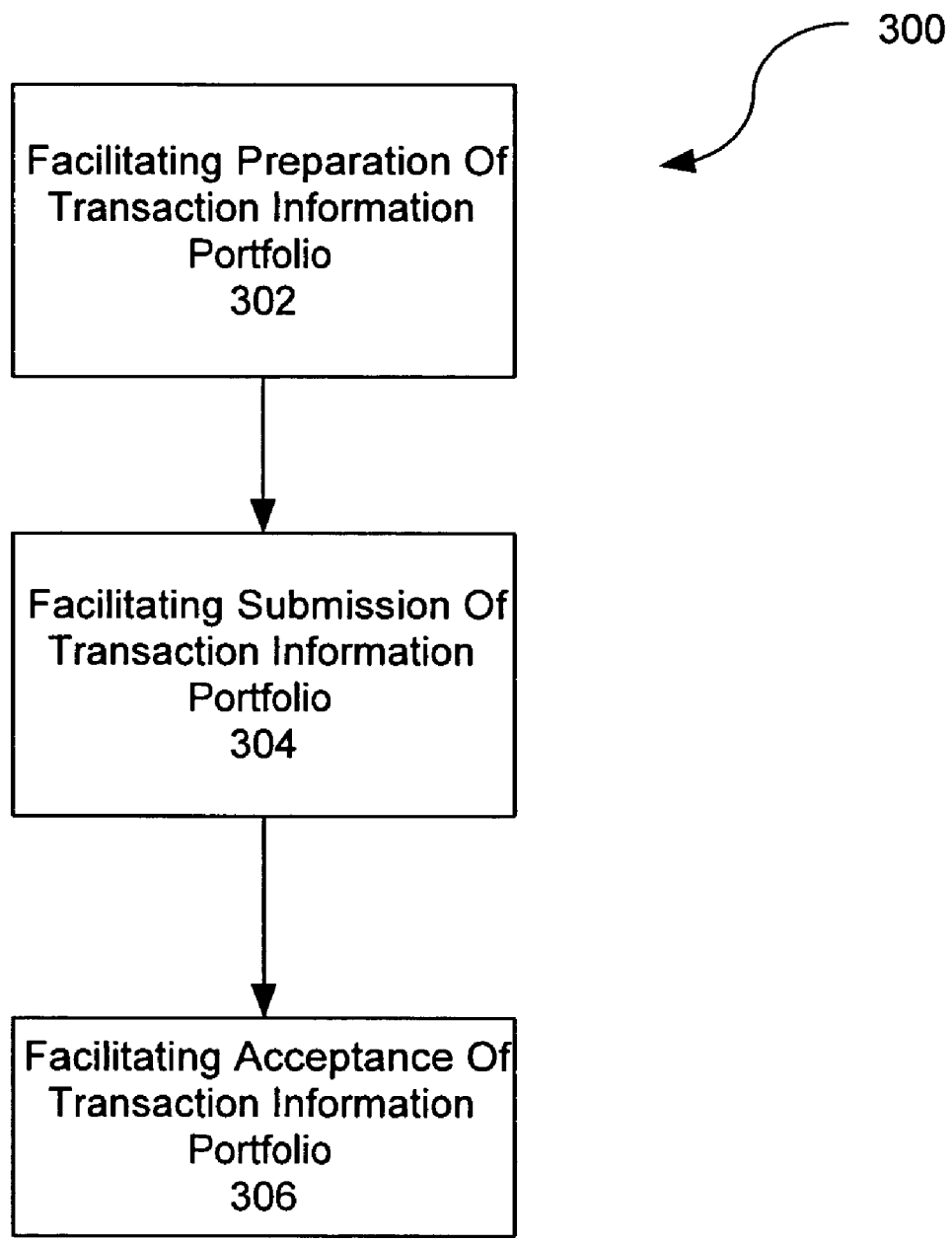
FIG. 3 depicts an embodiment of a computer-implemented method configured for facilitating management of international trade receivables transactions in accordance with the inventive disclosures made herein.

FIG. 3 depicts an embodiment of a computer-implement method 300 configured for facilitating management of international trade receivables transactions in accordance with the inventive disclosures made herein. With respect to managing a single international trade receivables transaction, an operation 302 is performed for facilitating preparation of a transaction information portfolio for the international trade receivables transaction. After preparing the transaction information portfolio, an operation 304 is performed for facilitating submission of the transaction information portfolio for reception by a designated recipient (e.g., an issuing bank for an export letter of credit), followed by an operation 306 being performed for facilitating system-managed acceptance of the transaction information portfolio.

Figure 4:
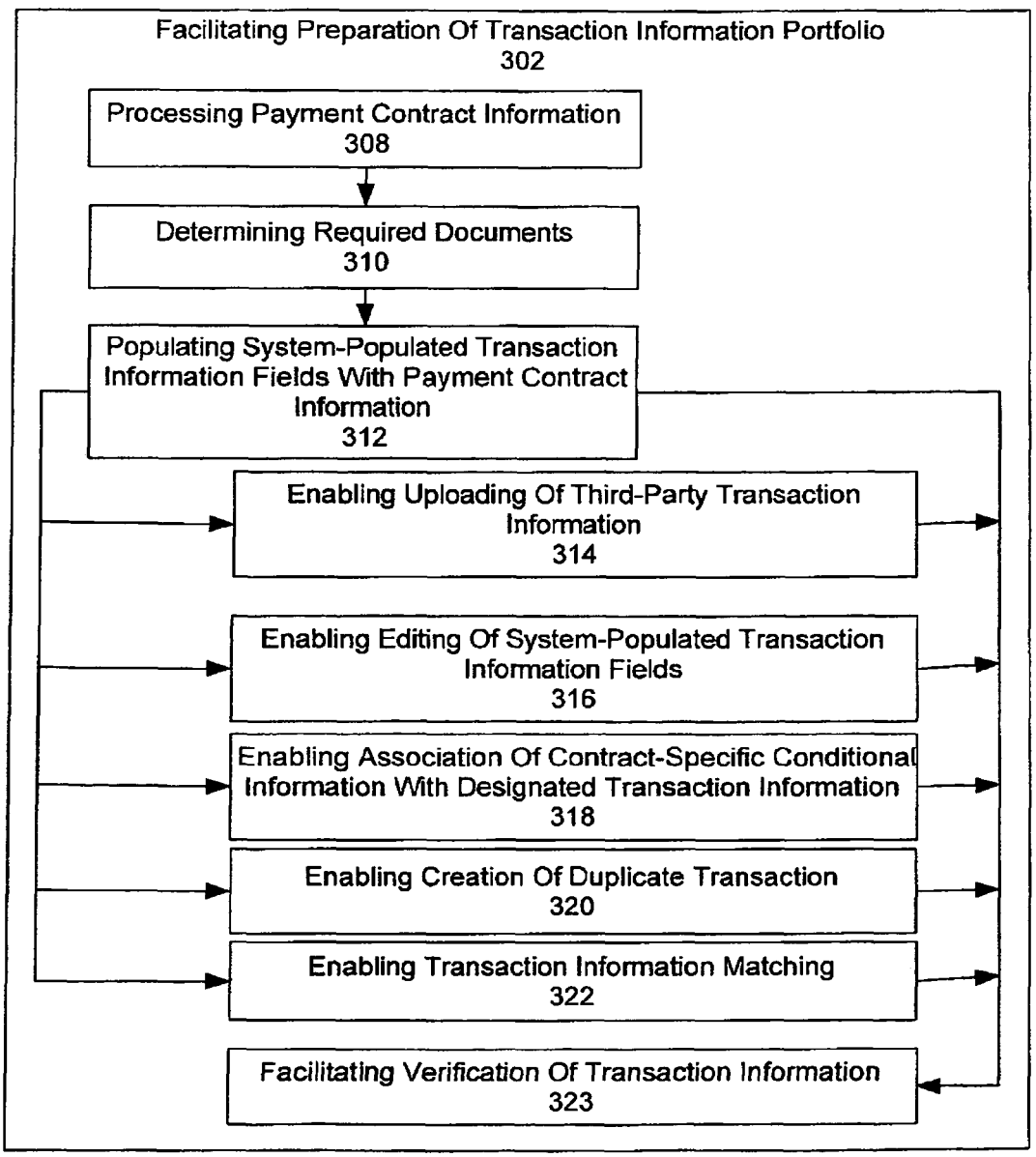
FIG. 4 depicts an embodiment of an operation for facilitating preparation of a transaction information portfolio for the international trade receivables transaction in accordance with the method depicted in FIG. 3.

FIG. 4 depicts an embodiment of the operation 302 for facilitating preparation of a verified transaction information portfolio for the international trade receivables transaction. A step 308 is performed for processing payment contract information (e.g., export letter of credit information). Examples of such processing include, but are not limited to, electronically receiving payment contract information (e.g., parsable data), parsing payment contract information, storing contract payment information and the like. In response to processing the payment contract information, a step 310 is performed for determining required transaction information for the international trade receivables transaction, followed by a step 312 for populating all of a portion of system-populated transaction information fields with respective portions of the payment contract information. System-populated transaction information fields are defined herein as transaction information fields (e.g., of documents) that are populated by a receivables transaction management platform in accordance with the inventive disclosures made herein.

Preferably, but not necessarily, the payment contract information is uploaded digitally and is in a system-extractable format. In one specific embodiment of system-extraction functionality, a user facilitates uploading of transaction information (e.g., a letter of credit or purchase orders) from one of any number of data sources to the receivables transaction management platform. The receivables transaction management platform parses the transaction information into identified data fields. After reviewing uploaded or manually entered transaction information, the user can then standardize data presentation and save the data (i.e., transaction information) to a data storage portion of the receivables transaction management platform (e.g., a database). Once saved the data is then automatically mapped to required fields in the system-populated transaction information fields without the need for any re-keying of data. Accordingly, such an approach for populating the fields of the documents includes systematically extracting the payment contract information and populating fields of required system-populated transaction information fields.

One advantageous aspect of the inventive disclosures made herein is that functionality is provided for data parsing of almost all bank formats of SWIFT. SWIFT (Society for World-wide Interbank Financial Telecommunications) is a computer-based message switching system used by most international banks as a method of making overseas payments, among other things. Key benefits of such parsing are saving time, no re-keying of data so errors are eliminated and data is mapped consistently across all documents in intended fields. Another advantageous aspect of the inventive disclosures made herein is that functionality is provided for data parsing of a variety of formats of purchase order, inventory and other international trade data created by user companies. Key benefits of such parsing are saving time, no re-keying of data so errors are eliminated and data is mapped consistently across all documents in intended fields.

In accordance with the inventive disclosures made herein, the document preparation process includes automation for parsing a payment contract into its data components and mapping the data components to the appropriate locations in the appropriate documents. This capability is supports other advantageous and novel capabilities. One example of such other advantageous and novel capabilities is data matching functionality that compares information in documents of the transaction information portfolio to the information in the corresponding payment contract and enabling access of the comparison by a recipient of the transaction information portfolio (e.g., a bank or importer). This functionality will advantageously assist in facilitating acceptance of the transaction information portfolio and, thus, settlement of the corresponding international trade receivables transaction (e.g., the process for examining and denoting disposition of transaction information in the transaction information portfolio). As the use of international trade "Straight Through Processing" (STP) becomes more widespread, this functionality will become increasingly valuable and useful.

Determination of the required transaction information for an international trade receivables transaction is at least partially dependant upon the type of the international trade transaction and/or a type of the payment contract. Additionally, at least a portion of the transaction information may be system-mandated (i.e., default documents and data), which are dependent upon the type of the international trade transactions and/or the type of the payment contract. Examples of such required transaction information includes, but are not limited to, a letter of credit document, a purchase order document, sales contract document, an invoice document, a packing list document, a certificate document, a transport manifest document, a fax template, government or customs forms and the like.

After populating such system-populated transaction information fields with payment contract data, the operation 302 enables various functionalities to be facilitated for furthering preparation of the transaction information portfolio. Examples of such functionalities include, but are not limited to, functionality for enabling uploading of third party prepared transaction information (i.e., at a step 314), functionality for enabling editing of transaction information comprised by the transaction information portfolio (i.e., at a step 316), functionality for enabling association of contract-specific conditional information (i.e., at a step 318), functionality for enabling creation of duplicate transactions (i.e., at a step 320) and functionality for enabling data matching between input data and information on prepared documents (i.e., at a step 322).

To enable such editing functionality, the third-party transaction information may be provided in a form that is system-editable (e.g., editable .pdf file format). In one embodiment of such editing functionality, the method 100 is configured for allowing users to make edits and add additional data such as dates and amounts that are not included in the source data directly in Adobe .pdf images of customized document templates. This enables users to see exactly what their printed transaction information will look like as they make the changes. Also, every field, including labels can be edited in every document. This creates a substantially flexible document structure that is necessary to meet the requirements of export transactions according to payment contracts such as letters of credit.

The functionality enabling association of contract-specific conditional information is useful in that payment contracts often include an "Additional Conditions" section describing conditions that must be complied with for the transaction to be approved. In one embodiment of this functionality, a tool is provided for allowing a reference to an additional condition to be designated and associated with a group of documents such that the reference is outputted (e.g., displayed or printed) on each of those documents. Thus, this functionality saves time and dramatically increases the likelihood that the additional conditions are met (e.g., whereby a reference to the condition is provided on each one of a plurality of associated documents when such documents are outputted).

The functionality for enabling creation of duplicate transactions allows efficient implementation of multiple transactions under a single payment contract (e.g., a letter of credit under which several related transactions are settled) or multiple similar payment contracts. The 'duplicate draw' functionality saves time and reduces errors by automatically copying prior transaction information into a new transaction. Once any necessary information that has changed (e.g., the transaction name, transaction reference number, ship date and quantity), the transaction information portfolio for the new transaction can be prepared without any substantive duplication of effort and in a manner that ensures that critical elements of the new transaction information portfolio match that of the original exactly. Preferably, but not necessarily, users may define filters for determining how much of the transaction information from a previous transaction is duplicated in the new transaction.

A step 323 is performed for providing system-managed verification of required transaction information in the transaction information portfolio. In one embodiment, such system-managed verification is performed dependent upon the type of the international trade transaction and/or the type of the payment contract. Through such verification, a desired probability that the transaction information comprised by each transaction information portfolio is complete and accurate may be achieved.

Preferably, but not necessarily, such transaction information is configured (e.g., designed, prepared and maintained) in a manner that is UCP 500 compliant. Accordingly, through verification of a transaction information portfolio, the transaction information portfolio has been determined and acknowledged to be UCP 500 compliant, and digitally delivered transaction information is certified as being UCP 500 compliant. Such UCP 500 compliant transaction information includes signatures (e.g., printed signatures and/or digital signatures) that are UCP 500 compliant and include system-implemented markings that indicate which transaction information documentation are copies and which transaction information documentation are originals.

Figure 5:
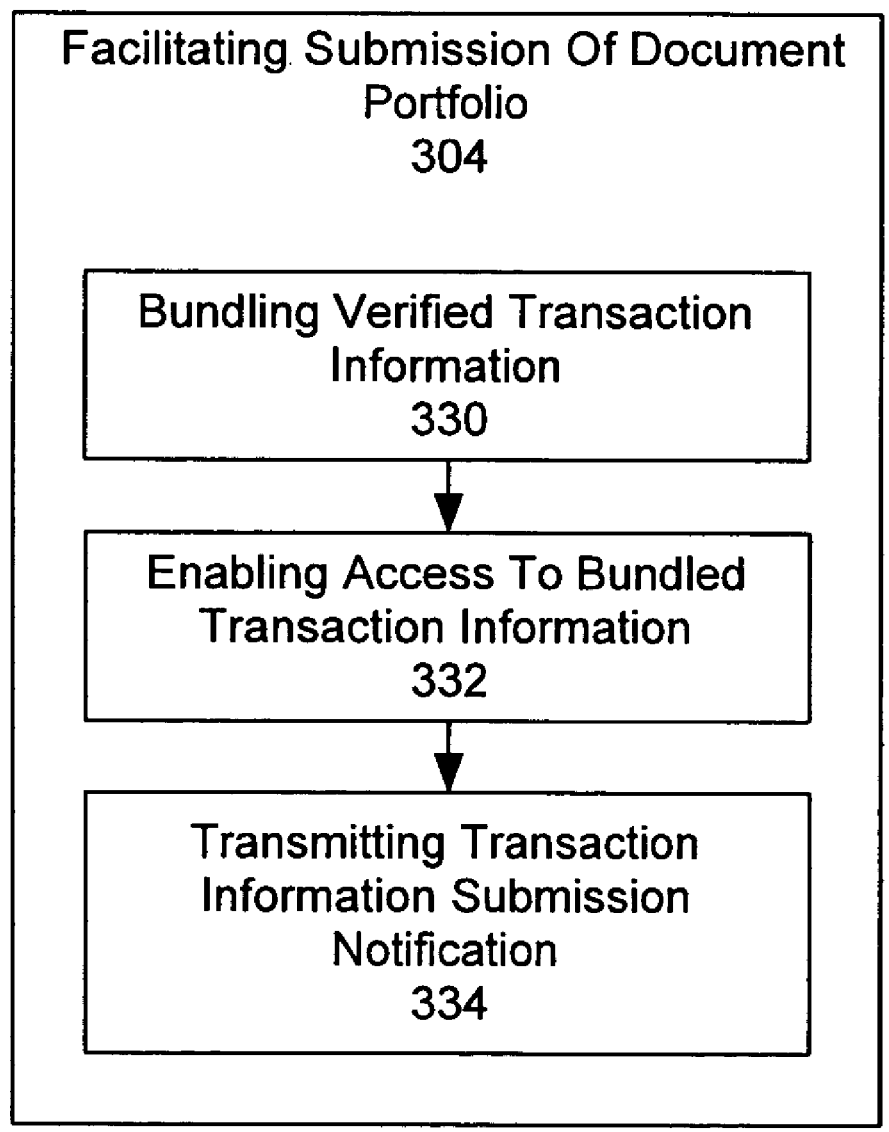
FIG. 5 depicts an embodiment of an operation for facilitating submission of the transaction information portfolio for reception by the designated recipient in accordance with the method depicted in FIG. 3.

FIG. 5 depicts an embodiment of the operation 304 for facilitating submission of the transaction information portfolio for reception by the designated recipient. A step 330 is performed for bundling transaction information (e.g., documents and data) comprised by the transaction information portfolio. Bundling creates a linkage between various elements of the transaction information for ensuring their subsequent transmission, delivery, examination, revision and/or acceptance as a complete and related set of transaction information. Additionally, bundling preferably, but not necessarily, provides for required originals and copies of transaction information (e.g., documents) of a transaction information portfolio being digitally "stitched" together inside one large Adobe .pdf document and locked against editing. To this end, an association is provided between data elements (e.g., populatable fields) in each of transaction information component (e.g., document) comprised by the transaction information portfolio. This association enables relative revision levels (i.e., a current revision level for each document) and associated tracking of such transaction information to be implemented.

After performing the bundling, a step 332 is performed for enabling access to the bundled documents (i.e., the bundled transaction information portfolio) and a step 334 is performed for transmitting a transaction information submission notification to the designated recipient. Preferably, but not necessarily, enabling access to the bundled transaction information portfolio includes enabling access over a public network (e.g., the Internet) by via a website (e.g., a receivables transaction management platform portal). One example of the transaction information portfolio submission notification is an e-mail that includes a link to a section of the website from which access may be facilitated (e.g., a log-in page of the receivables transaction management platform portal).

Preferably, but not necessarily, submission of a transaction information portfolio includes submission (e.g., digital delivery) of UCP 500 compliant transaction information comprised by such transaction information portfolio. Accordingly, through delivery of such UCP compliant transaction information, the associated international trade receivables transaction is settled with a high degree of credibility, certainty and uniformity, regardless of the country in which the transaction takes place. In one embodiment, such digitally delivered transaction information includes signatures (e.g., printable signatures and/or digital signatures) that are UCP 500 compliant and includes system-implemented markings that indicate which documentation are copies and which documentation are originals.

FIG. 6 depicts an embodiment of the operation 306 for facilitating system-managed acceptance of the transaction information portfolio. A step 340 is performed for receiving the submission notification transmitted in response to submission of the original transaction information portfolio (i.e., at the step 334 in FIG. 5). The submission notification consists of an e-mail message to the recipient, which includes a receivables transaction management platform portal link (i.e., a website link) at which the recipient can gain on-line access to the transaction information portfolio corresponding to the submission notification. A step 342 is performed for accessing the transaction information portfolio. Such accessing the transaction information portfolio includes logging into the receivables transaction management platform portal and subsequently navigating to a webpage where the transaction information portfolio is accessed.

After accessing the transaction information portfolio, a step 344 is performed for denoting the disposition of each document in the transaction information portfolio (e.g., after a thorough examination of each document). Each document is denoted as being discrepant or acceptable. For each document that is denoted as being discrepant, a corresponding discrepancy is specified. In one embodiment, the act of denoting a document as discrepant mandates that at least one corresponding discrepancy to be specified. A webpage including selectable boxes for designating whether each document is accepted or discrepant and having fields for denoting discrepancies associated with each document having been denoted as being discrepant is an example of a means for enabling the disposition of transaction information to be facilitated. The functionality associated with the step 344 is an example of discrepancy feedback functionality.

After the disposition of each document has been denoted, a step 346 is performed for submitting a document disposition notification for reception by the receivables transaction management platform. In one embodiment, the document disposition notification (e.g., a message received and acted on by the receivables transaction management platform) is submitted in response to selecting a button designating completion of the current portfolio examination step.

When none of the transaction information in the transaction information portfolio is denoted as including discrepant information, the method 300 proceeds with submitting the transaction information to the appropriate party(ies) for enabling settlement of the transaction to proceed offline under the terms and conditions defined in the payment contract.

When one or more elements of the transaction information of the transaction information portfolio is denoted as including discrepant information, a step 348 is performed for requesting instruction for how to proceed from the exporter of the goods in the transaction. Examples of such instruction for how to proceed include, but are not limited to, submitting revised transaction information to exporter's bank and/or buyer's bank, submitting the transaction information portfolio as-is (i.e., including the document(s) with discrepant information) to buyer and/or buyer's bank, holding the transaction information portfolio and sending a message to buyer and/or buyer's bank regarding the discrepant information, and terminating the process for allowing the exporter to resolve matters/proceed offline.

In response to the instructions from the exporter being submitting revised transaction information to the recipient of the transaction information portfolio, a step 350 is performed for facilitating revision of discrepant transaction information (i.e., revising information that affects one or more elements of the transaction information). Examples of tasks associated with facilitating transaction information revision include, but are not limited to, requesting additional information from the original recipient of the transaction information portfolio, identifying specific documents and data associated with discrepant information, identifying information fields associated with discrepant information, enabling modification to information in fields of one or more documents, modifying information in one or more system-populated transaction information fields, modifying information in one or more fields of a third-party provided document and sourcing a replacement third party document.

After appropriate revision of the discrepant information is completed, a step 352 is performed for enabling access to the revised version of the discrepant transaction information (i.e., the revised document) and a step 354 is performed for submitting submission notification for reception by the recipient. One embodiment of enabling access to the revised document includes replacing access to a previous version of the transaction information with access to the revised transaction information. Thereafter the operation 306 continues at the step 340 where the recipient receives the submission notification (i.e., the revised transaction information submission notification). In one embodiment of enabling access to the revised document, revised versions of discrepant elements of the transaction information are individually re-submitted to the designated recipient whereby transaction information denoted as being acceptable need not be resubmitted. Eliminating the need to re-examine such acceptable transaction information advantageously saves time and resources.

In response to the instructions from the exporter being other than instructions to submit revised document(s), the method 300 proceeds, accordingly. For example, the transaction information portfolio can be sent as-is (including discrepant information) to the buyer and/or buyer's bank, the document and data portfolio can be held while a message regarding the discrepant information is sent to buyer and/or buyer's bank, and the system managed process can be suspended for allowing the Exporter to resolve matters/proceed off-line.

Referring now to computer readable medium, methods, processes and/or operations adapted for carrying out international trade receivables transaction functionality as disclosed herein are tangibly embodied by computer readable medium having instructions thereon for carrying out such functionality. In one specific embodiment, the instructions are tangibly embodied for carrying out the workflow structure 200 and/or the method 300 disclosed above to facilitate international trade receivables transaction functionality. The instructions may be accessible by one or more data processors from a memory apparatus (e.g. RAM, ROM, virtual memory, hard drive memory, etc), from an apparatus readable by a drive unit of the data processing system (e.g., a diskette, a compact disk, a tape cartridge, etc) or both. Accordingly, embodiments of computer readable medium in accordance with the inventive disclosures made herein include a compact disk, a hard drive, RAM or other type of storage apparatus that has imaged thereon a computer program (i.e., a set of instructions) adapted for carrying out international trade receivables transaction functionality in accordance with the inventive disclosures made herein.

Embodiments of systems, platforms and methods in accordance with the inventive disclosures made herein lend themselves well to e-UCP letter of credit (LC) transactions. E-UCP is a supplement to current existing Uniform Customs and Practice for Documentary Credits (UCP500), and governs the use of electronic presentation of transaction information. Embodiments of such systems, platforms and methods in accordance with the inventive disclosures made herein may be configured for enabling facilitation of steps required for an issuing bank to make international trade receivables transactions entire e-UCP compliant. Associated benefits include, but are not limited to, elimination of courier charges, elimination of advising bank and first examination bank charges, streamlined processing that reduces transaction turn-around times, and overall reduction in discrepancies.

There are at least two types of scenarios for e-UCP transactions in international trade receivables transactions. In first type of scenario, the issuing bank sends a letter of credit directly to the beneficiary and bypasses the advising bank. The beneficiary subsequently submits documents to the issuing bank for examination and payment. In a second type of scenario, the issuing bank sends a letter of credit through an advising bank. The beneficiary subsequently sends documents to the advising bank for examination. The advising bank then examines documents, and claims payment sending documents to the issuing bank for final settlement.

Referring now specifically to the first scenario, there is no advising bank. The transaction flow involves the issuing bank that issues the letter of credit and submits the letter of credit directly to the beneficiary. Once documents are ready to present per the letter of credit terms, the beneficiary submits the documents directly to the issuing bank. Preferably the letter of credit is formatted as a SWIFT MT700 message type. The issuing bank issues the letter of credit as it does normally but includes following terms: 1.) the letter of credit must reference that it is subject to the Supplement of the Uniform Customs and Practice for Documentary Credits for Electronic Presentation (eUCP), 2.) the letter of credit should specify the applicable version of eUCP, 3.) if no version is indicated, the letter of credit is subject to the version in effect on the date the letter of credit was issued and 4.) the letter of credit must state a place for presentation of the electronic records in field 47*a*. The issuing bank sends the letter of credit directly to the beneficiary via a digital file that preferably utilizes the bank's web-based advising product.

In coordination with the beneficiary, a system in accordance with the inventive disclosures made herein is used for facilitating downloading of the letter of credit in its digital form into the system and creating a new transaction record for the international receivables trade transaction. The system, system administrator and/or the beneficiary selects documents required by the letter of credit terms from a digital library of documents and ties them to the transaction record. These digital documents include, but are not limited to invoices, packing lists, various certificates, etc. The terms of the letter of credit are auto-mapped (i.e., associated) to the required documents. Additional terms outside of the letter of credit are inputted, via the system and/or the beneficiary, into the documents where required.

The system, system administrator and/or the beneficiary provide instructions to the freight forwarder/carrier to create the bill of lading or air waybill. The system, system administrator and/or the beneficiary receive a copy of the bill of lading or air waybill, and insure that the terms are correct. If correct, the system, system administrator and/or the beneficiary will: if an ocean bill of lading is required, upload the bill of lading from the carrier's web-site in its digital form to the system and, if an air waybill is required, a duplicate air waybill will be created directly from the system's digital library of air waybills.

Once documents are complete, the system, system administrator and/or the beneficiary will submit the documents to the issuing bank via the system. The submission process generates an email to the appropriate examination unit at the issuing bank. Presentation will match the eUCP requirement in Article e5a that electronic records must state a place for presentation of electronic records, which should be noted in the LC SWIFT message tag 47a. The examination unit at the issuing bank will receive an email notification from TRADE that documents have been submitted under a specified transaction reference and are ready to exam. The issuing bank's examination unit logs into the system (e.g., user-IDs and passwords are given in advance), and is directed to the subject transaction. Examination copies are then downloaded and reviewed. If discrepancies are noted, the discrepancy notice is provided via the system and the bank notifies the system and/or the beneficiary. The system administrator and/or the beneficiary correct the discrepancy and re-submit the corrected document. Once documents are clean, the issuing bank prints out and provides the original documents as required by the letter of credit terms to the applicant, and makes payment to the beneficiary.

In the event that the beneficiary of the letter of credit uses different vendors to supply the product, or the letter of credit is transferable, the same steps as described above can apply relative to making the letter of credit eUCP compliant. The system administrator an/or the beneficiary can still create the required documents and make arrangements with the carrier to have the bill of lading or air waybill done digitally, and submit the documents on-line to the issuing bank. The process can still work, even in the event that the vendor supplies paper documents to the carrier in order to get the shipment booked and loaded. Arrangements will still be made with the carrier to provide the relevant shipping documents as required by the letter of credit, which will be available via the system in digital form.

Referring now specifically to the second scenario, there are two banks involved with the LC transaction: the issuing bank and an advising bank. In order to make sure that the advising bank can comply with the eUCP terms, the advising bank will need to be either a foreign branch of the issuing bank or a correspondent of the issuing bank for whom the issuing bank provides back-office letter of credit processing. Preferably, the letter of credit is formatted as a SWIFT MT700 message type. The issuing bank issues the letter of credit as it does normally but includes following terms: 1.) the letter of credit must reference that it is subject to the Supplement of the Uniform Customs and Practice for Documentary Credits for Electronic Presentation (eUCP), 2.) the letter of credit should specify the applicable version of eUCP. 3.) if no version is indicated, the letter of credit is subject to the version in effect on the date the letter of credit was issued, 4.) the letter of credit must state a place for presentation of the electronic records in field 47a, and 5.) additional conditions include "soft restriction" language to the effect that the foreign branch of the issuing bank (or the correspondent for which it does back-office processing) holds special handling instructions regarding the payment and disposal of documents.

When the letter of credit is issued, it is advised via SWIFT as an MT700 message to the advising bank. The advising bank will preferably be the foreign branch of the issuing bank or the correspondent for which the issuing bank does back-office letter of credit processing (hereinafter included as advising bank). The advising bank will have access to a system in accordance with the inventive disclosures made herein. The system administrator in coordination with the beneficiary and the advising bank, downloads the letter of credit in the SWIFT MT 700 digital form into the system and creates a new transaction record.

The system, the system administrator and/or the beneficiary select the documents required by the letter of credit terms from the digital library of documents and tie them to the transaction record. These digital documents include invoices, packing lists, various certificates, etc. The terms of the letter of credit are auto-mapped (i.e., associated) to the required documents. Additional terms outside of the letter of credit are input by the system administrator and/or the beneficiary into the documents, where required.

The system, system administrator and/or the beneficiary provide instructions to the freight forwarder/carrier to create the bill of lading or air waybill. The system, system administrator and/or the beneficiary receive a copy of the bill of lading or air waybill, and insure that the terms are correct. If correct, the system, system administrator and/or the beneficiary will: if an ocean bill of lading is required, upload the bill of lading from the carrier's web-site in its digital form to the system and, if an air waybill is required, a duplicate air waybill will be created directly from the system's digital library of air waybills.

Once documents are complete, the system, system administrator and/or the beneficiary submit the documents to the advising bank (or the correspondent for which the issuing bank does back-office LC processing) as the first examining bank via system. The submission process generates an email to the appropriate examination unit at the advising/first examining bank. The examination unit at the advising bank receives an email notification from TRADE that documents have been submitted under a specified transaction reference and are ready to exam. The advising bank's examination unit logs into the system and goes to the referenced transaction. Examination copies are downloaded and reviewed. If discrepancies are noted, the discrepancy notice is provided via the system and the first examining bank notifies TRADE and/or beneficiary. The system, system administrator and/or the beneficiary correct the discrepancy and re-submit the corrected document.

Once the documents are clean, the advising bank notifies the issuing bank that it has examined documents, they are clean, and requests payment according to the letter of credit terms. After receipt of notice from the advising bank, the issuing bank logs into the system, go to the transaction referenced by the advising bank, and print the documents from the system for presentation to the buyer/letter of credit applicant. Presentation should match the eUCP requirement in Article e5a that electronic records must state a place for presentation of electronic records, which should be noted in the LC SWIFT message tag 47a.

In the event that the beneficiary of the letter of credit uses different vendors to supply the product, or the letter of credit is transferable, the same steps can apply relative to making the letter of credit eUCP compliant. The system administrator and/or the beneficiary can still create the required documents and make arrangements with the carrier to have the bill of lading or air waybill done digitally, and submit the documents on-line to the issuing bank. The process can still work, even in the event that the vendor supplies paper documents to the carrier in order to get the shipment booked and loaded. Arrangements will still be made with the carrier to provide the relevant shipping documents as required by the letter of credit, which will be available on the system in digital form.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical, mechanical and electrical changes may be made without departing from the spirit or scope of the invention. For example, functional blocks shown in the figures could be further combined or divided in any manner without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A computer-implemented method configured for facilitating export receivables workflow tasks, comprising:
   at least one data processing device of a data computing system accessing, from memory coupled to said at least one data processing device, instructions causing said at least one data processing device to upload an electronic copy of a payment contract upon which an international trade receivables transaction is dependent;
   said at least one data processing device accessing, from said memory, instructions causing said at least one data processing device to prepare a transaction information portfolio including documents required for settlement of the international trade receivables transaction, wherein preparing the transaction information portfolio includes selecting said required documents dependent upon a type of the payment contract and wherein said required documents comprise transaction information for the international trade receivables transaction;
   said at least one data processing device accessing, from said memory, instructions causing said at least one data processing device to cause a disposition of said required documents to be denoted as being discrepant or acceptable;
   said at least one data processing device accessing, from said memory, instructions causing said at least one data processing device to cause a description corresponding to a corresponding discrepancy to be specified;
   said at least one data processing device accessing, from said memory, instructions causing said at least one data processing device to cause revised versions of discrepant portions of said required documents to be individually re-submitted to the designated recipient whereby documents denoted as being acceptable need not be resubmitted;
   said at least one data processing device accessing, from said memory, instructions causing said at least one data processing device to perform system-managed verification that said transaction information is compliant with an international banking standard in accordance with which information of the payment contract is reviewed in response to determining that all of said documents are denoted as being acceptable; and
   said at least one data processing device accessing, from said memory, instructions causing said at least one data processing device to bundle said required documents whereby an association is provided between said required documents in response to verifying that said transaction information is compliant with the international banking standard.

2. The method of claim 1, further comprising:
   said at least one data processing device accessing, from said memory, instructions causing said at least one data processing device to systematically extract information from the payment contract and populating fields of at least one of said required documents with said extracted information, wherein said information is provided in the payment contract in a system-extractable format.

3. The method of claim 1 wherein at least a portion of said required documents are system-mandated documents automatically selected by said system dependent upon at least one of a type of the international trade transaction and the type of the payment contract.

4. The method of claim 1 wherein:
   said system-managed verification is performed dependent upon at least one of a type of the international trade transaction and the type of the payment contract in combination with the international banking standard; and
   said instructions causing said at least one data processing device to perform said bundling includes said instructions causing said at least one data processing device to cause an original copy and a duplicate copy of at least one of said required documents to be digitally adjoined with each other in a un-editable document file.

5. The method of claim 1, further comprising:
   said at least one data processing device accessing, from said memory, instructions causing said at least one data processing device to determine a required condition associated with settling the international trade receivables transaction; and
   said at least one data processing device accessing, from said memory, instructions causing said at least one data processing device to associate the required condition with a plurality of said required documents whereby a reference to the condition is provided on each one of said required documents when said required documents are outputted.

6. The method of claim 1 wherein:
   the international trade receivables transaction is one of a plurality of international trade receivables transactions to be settled under a common payment contract; and
   a first system-managed instance of said international trade receivables transactions serves as a template for each subsequent system-managed instance of said international trade receivables transactions, whereby consistency in content and accuracy between each said system-managed instance is provided for.

7. The method of claim 1 wherein:

the association includes a current revision level of each one of said required documents; and causing said at least one data processing device to verify that the transaction information portfolio is compliant with an international banking standard includes causing said at least one data processing device to determine that said required documents have necessary signature information indicating and certifying that said required documents are compliant with the international banking standard and have system-implemented markings that indicate which ones of such required documents are copies and which ones of said required documents are originals.

8. The method of claim 1, further comprising:

said at least one data processing device accessing, from said memory, instructions causing said at least one data processing device to systematically extract information from the payment contract and populating fields of at least one of said required documents with said extracted information;

said at least one data processing device accessing, from said memory, instructions causing said at least one data processing device to determine a required condition associated with settling the international trade receivables transaction; and said at least one data processing device accessing, from said memory, instructions causing said at least one data processing device to associate the required condition with a plurality of said required documents whereby a reference to the condition is provided on each one of said required documents when said required documents are outputted;

wherein said extracted information is provided in the payment contract in a system-extractable format;

wherein at least a portion of said required documents is system-mandated documents dependent upon at least one of a type of the international trade transaction and the type of the payment contract;

wherein causing said at least one data processing device to verify that the transaction information portfolio is compliant is performed dependent upon at least one of the type of the international trade transaction and the type of the payment contract.

9. A system configured for facilitating document and export receivables workflow tasks, comprising:

at least one data processing device;

instructions processable by said at least one data processing device; and an apparatus from which said instructions are accessible by said at least one data processing device;

wherein said instructions are configured for enabling said at least one data processing device to facilitate:

uploading an electronic copy of a payment contract upon which an international trade receivables transaction is dependent;

preparing a transaction information portfolio including documents required for settlement of the international trade receivables transaction, wherein preparing the transaction information portfolio includes selecting said required documents dependent upon a type of the payment contract and wherein said required documents comprise transaction information for the international trade receivables transaction;

causing a disposition of said required documents to be denoted as being discrepant or acceptable;

causing a description corresponding to a corresponding discrepancy to be specified;

causing revised versions of discrepant portions of said required documents to be individually re-submitted to the designated recipient whereby documents denoted as being acceptable need not be resubmitted;

performing system-managed verification that said transaction information is compliant with an international banking standard in accordance with which information of the payment contract is reviewed in response to determining that all of said documents are denoted as being acceptable; and bundling said required documents whereby an association is provided between said required documents in response to verifying that said transaction information is compliant with the international banking standard.

10. The system of claim 9, further comprising:

systematically extracting information from the payment contract and populating fields of at least one of said required documents with said extracted information, wherein said information is provided in the payment contract in a system-extractable format.

11. The system of claim 9 wherein at least a portion of said required documents are system-mandated documents automatically selected by said system dependent upon at least one of a type of the international trade transaction and the type of the payment contract.

12. The system of claim 9 wherein;

said system-managed verification is performed dependent upon at least one of a type of the international trade transaction and the type of the payment contract in combination with the international banking standard; and said bundling causes an original copy and a duplicate copy of at least one of said required documents to be digitally adjoined with each other in a un-editable document file.

13. The system of claim 9, further comprising:

determining a required condition associated with settling the international trade receivables transaction; and associating the required condition with a plurality of said required documents whereby a reference to the condition is provided on each one of said required documents when said required documents are outputted.

14. The system of claim 9 wherein:

the international trade receivables transaction is one of a plurality of international trade receivables transactions to be settled under a common payment contract; and a first system-managed instance of said international trade receivables transactions serves as a template for each subsequent system-managed instance of said international trade receivables transactions, whereby consistency in content and accuracy between each said system-managed instance is provided for.

15. The system of claim 9 wherein:

the association includes a current revision level of each one of said required documents; and verifying that the transaction information portfolio is compliant with an international banking standard includes determining that said required documents have necessary signature information indicating and certifying that said required documents are compliant with the international banking standard and have system-implemented markings that indicate which ones of such required documents are copies and which ones of said required documents are originals.

16. The system of claim 9, further comprising:
systematically extracting information from the payment contract and populating fields of at least one of said required documents with said extracted information;
determining a required condition associated with settling the international trade receivables transaction; and
associating the required condition with a plurality of said required documents whereby a reference to the condition is provided on each one of said required documents when said required documents are outputted;
wherein said information is provided in the payment contract in a system-extractable format;
wherein at least a portion of said required documents is system-mandated documents dependent upon at least one of a type of the international trade transaction and the type of the payment contract;
wherein verifying that the transaction information portfolio is compliant is performed dependent upon at least one of the type of the international trade transaction and the type of the payment contract.

* * * * *